O. HUSSEY.

Harvester Cutter.

No. 449. Reissued April 14, 1857.

N. PETERS. Photo-Lithographer, Washington, D. C.

UNITED STATES PATENT OFFICE.

OBED HUSSEY, OF BALTIMORE, MARYLAND.

IMPROVEMENT IN REAPING-MACHINES.

Specification forming part of Letters Patent No. 5,227, dated August 7, 1847; Reissue No. 449, dated April 14, 1857.

*To all whom it may concern:*

Be it known that I, OBED HUSSEY, of the city of Baltimore, in the county of Baltimore and State of Maryland, have invented a new and useful Improvement in the Reaping-Machine; and I do hereby declare that the following is a full, clear, and exact description of the construction and operation of the same, reference being had to the annexed drawings, making a part of this specification, in which—

Figure 1:
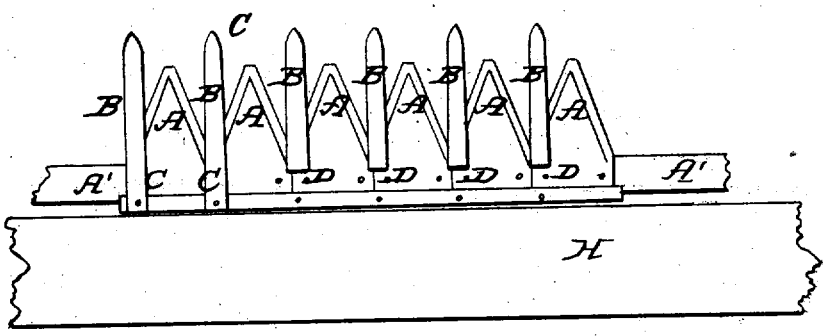

Figure 1 is a bird's-eye view of the cutting apparatus, in which A A A A A A represent angular blades, and A′ A′ the stock of a vibrating sickle, the blades being riveted or otherwise secured to the stock, and so constructed and arranged that their cutting-edges form a zigzag or scalloped line. B B B B B B represent the permanent guard-irons. H represents a part of the wood-work. The guards are formed of a lower piece and an upper piece, admitting the blade to pass between in cutting, so that the straw, grass, hemp, corn, &c., which comes in between the guards to be cut is firmly supported both above and below the vibrating blades.

In my original invention—viz., the reaping-machine patented by me in 1833—the upper part of the guards was fastened to the lower part both before and behind the blades, as represented at C C C C, and the grass, straw, &c., which was not perfectly cut was forced in by the shearing motion of the blades and worked back between the blades and the guards, materially obstructing the free movement of the blades, in wet weather frequently causing what the farmers call "choking." The improvement for which a patent is now asked is represented at D D D D, one piece of the guard being fastened to the other piece only at the point, leaving their back ends unconnected. Consequently the space between the upper and lower pieces of the guard, through which the blades vibrate, is open behind, so that the grass, &c., which is forced in by the action of the blades, now pass freely out through the opening. This improvement is represented at D D D D, Fig. 1.

In my original sickle, patented in 1833, the blades are ground with a bevel on both sides of the edge. The purpose of this is that by means of the shoulder of the bevel the sharp edge is prevented from coming in contact with the finger, and when sprung or bent cutting into the finger. This bevel is not so necessary near the forks of the blades as near their points, where they spring more easily, and as the double bevel diminishes their shearing action I prefer to make about one inch of edge at the fork flush on one side, leaving the bevel all on the other side. The design of this is that the grass, &c., which is forced in between the blades and the guards shall be cut up and worked out by the flush edge acting close to the finger at the fork. This mode of beveling the blade, although deemed by me to be an improvement, is not a part of the invention herein claimed.

Figure 2:
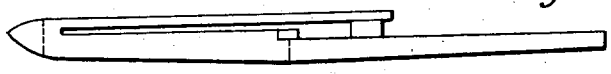

Fig. 2 is a side view of one of the guards of my original machine. It is also represented at C C, Fig. 1, attached to a part of the wood-work H.

Figure 3:
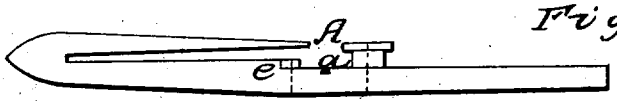

Fig. 3 represents one of the guards containing the improvement before described. A is the opening, at the rear of which is shown a flanged guide-bar, *a*, for the back of the stock of the sickle to slide against, and in front another guide-bar, *e*, for the forward side of the stock. The latter guide is omitted in Fig. 1, leaving the shoulders of the fingers to act as the guide for the front of the stock.

Figure 4:
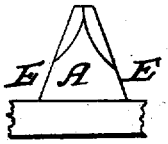

Fig. 4 represents a view of one of the blades A with the flush edge E E on each side of and at the fork of the blade. The rearward or retreating angles of the zigzag edge of the sickle I call the "forks" of the blades and the forward or salient angles I call the "points" of the blades.

Reaping-machines have heretofore been constructed some with straight blades with smooth edges and having a vibratory motion, and others with circular blades with smooth or sickle edges and having a rotary motion, in which the cutters were arranged to work through slots between the upper and lower parts of guard-fingers, which parts were connected only at the front ends. In such machines the fingers acted, first, as guards or protectors to prevent the edge of the cutter from being injured by collision with stones or similar obstacles, and, second, like the teeth of a comb, to divide the stalks of grain or grass while being cut into narrow strips or parcels and hold them from leaning to the right or left as the edges of such cutters were borne forward against the stalks and drawn across to cut them. It is evident that in such cutting apparatus the blades of smooth edged cut like a knife, or, if sickled, cut like a saw without the aid of another edge, between which and the edge of the blade the stalks may be sheared or clipped; but in machines in which the cutter has a scalloped edge the fingers serve three purposes: first, they act as protectors to the edge; secondly, they divide and hold up the stalks; and, thirdly, they act as fixed shear-blades between which and the edges of the scallops the grain or grass is clipped; but the shearing or clipping action tends to force the stalks crosswise of the finger into the slot, so that in such machines the slots between the upper and lower parts of the fingers, through which the scallops play, are liable to clog or choke, either impeding or wholly preventing the cutting action of the machine. By reason of this tendency of the scalloped sickle to force the stalks across, and thus entangle them upon the fingers, all the modes heretofore devised of working this sickle were comparatively ineffective. But as the scalloped blade is, in my judgment, the best of all cutters, it is of great importance to overcome every impediment to its successful working, which I have done in the manner before described—viz., by combining with it a slotted finger, the upper and lower parts of which are connected with each other only at the points, and one part only being attached to the frame of the machine, leaving an opening at the rear of the slot through which the clogging matter can work its way out.

I claim as my invention—

The combination of a vibrating scalloped cutter, the indentations of whose edge act as a series of moving shear-blades, with slotted guard-fingers, the sides of which act as a corresponding series of fixed shear-blades, the parts of such fingers forming the slot being connected at the front ends only, leaving the rear of the slot open and free for the escape of material that would otherwise clog the cutter, substantially as described.

In testimony whereof I have hereunto subscribed my name.

OBED HUSSEY.

In presence of—
WM. D. BALDWIN,
HENRY BALDWIN, Jr.